United States Patent [19]

Pernyeszi

[11] 4,241,239
[45] Dec. 23, 1980

[54] FLUXBUCKING LINE TRANSFORMER WITH ELECTRONIC EQUIVALENT LINE TERMINATING IMPEDANCE

[75] Inventor: Joseph Pernyeszi, Fairfield, Conn.

[73] Assignee: International Telephone and Telegraph Corporation, New York, N.Y.

[21] Appl. No.: 881,085

[22] Filed: Feb. 24, 1978

[51] Int. Cl.³ .................... H01F 19/02; H01F 27/38; H04Q 1/28; H04M 1/74
[52] U.S. Cl. ............................ 179/70; 179/18 FA; 323/48
[58] Field of Search ............ 179/16 A, 16 AA, 16 F, 179/18 F, 18 FA, 70, 77; 323/48

[56] References Cited

U.S. PATENT DOCUMENTS

| | | | |
|---|---|---|---|
| 3,384,810 | 5/1968 | Kelsey | 323/48 |
| 3,714,548 | 1/1973 | Macrander et al. | 323/48 |
| 3,886,322 | 5/1975 | Colardelle et al. | 179/170 NC |
| 3,959,718 | 5/1976 | Hasegawa | 323/48 |
| 4,027,235 | 5/1977 | Macrander et al. | 179/18 FA |
| 4,039,766 | 8/1977 | Picandet | 179/170 NC |
| 4,110,636 | 8/1978 | Dijkmans | 179/70 |

FOREIGN PATENT DOCUMENTS

2254168  7/1975  France ........................... 179/77

Primary Examiner—Bernard Konick
Assistant Examiner—Randall P. Myers
Attorney, Agent, or Firm—John T. O'Halloran; Jeffrey P. Morris

[57] ABSTRACT

A fluxbucking line transformer is disclosed in which fluxbucking primary windings in the line transformer compensate for the DC flux generated by the passing of DC currents by the primary windings. No feed-back circuitry is required for sensing the DC components of the magnetic field in the transformer core or to sense the DC current through the transformer to provide adjustment of the fluxbucking current. The disclosed transformer circuit is a bridge configuration which cancels the DC flux independently in separate primary windings, and is advantageously employed in telephone line circuits in which large DC currents are passed through the line transformer while smaller ac signals are coupled to the secondary without distortion of the ac signals due to saturation of the transformer core.

4 Claims, 4 Drawing Figures

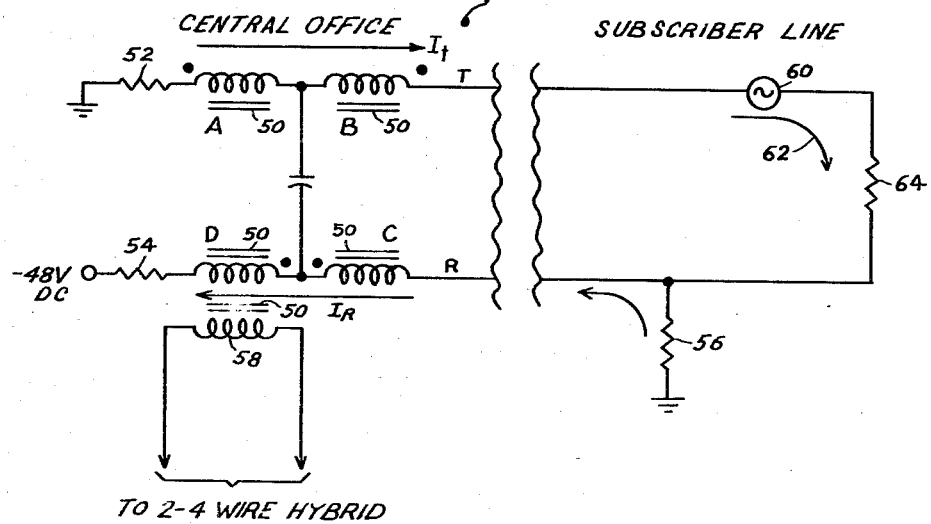
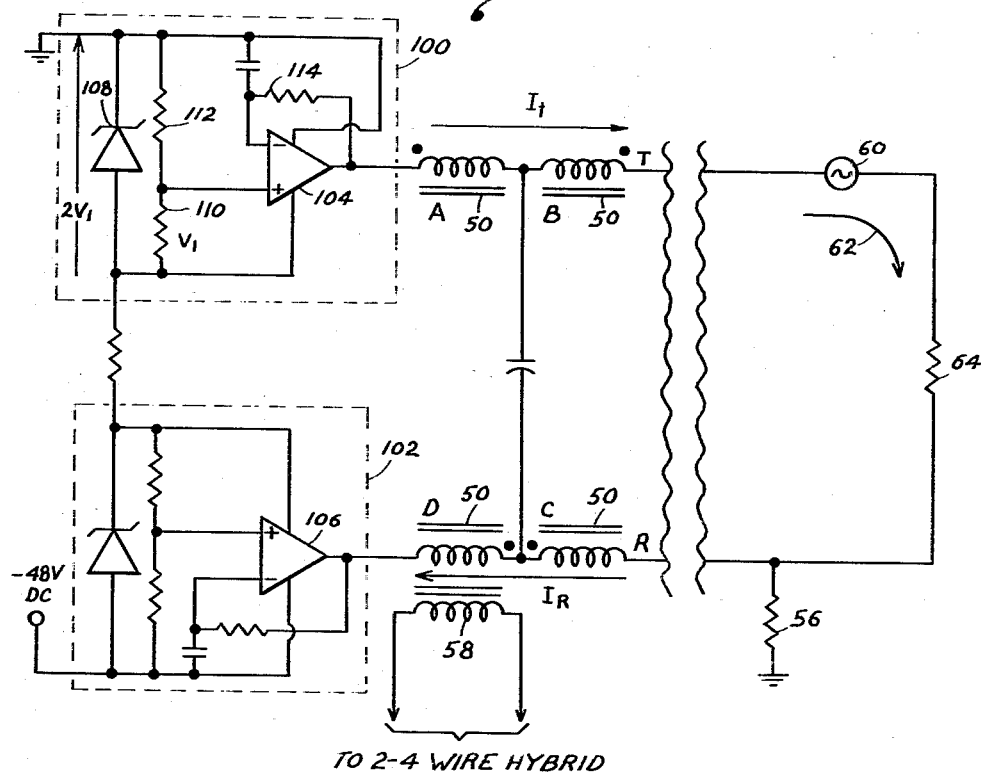

FLUXBUCKING LINE TRANSFORMER WITH ELECTRONIC EQUIVALENT LINE TERMINATING IMPEDANCE

BACKGROUND OF THE INVENTION

1. Field of the Invention

The present invention relates generally to fluxbucking transformers and more particularly to fluxbucking line transformers particularly suitable for application in telephone line circuits.

2. Description of the Prior Art

In present day telephone subscriber systems it is required to couple large DC biases on the order of 50 volts thru the primary windings of line transformers to the telephone tip and ring lines of the subscriber sets to provide various DC voltages, such as the voltage required for operation of the telephone carbon microphone, upon which DC voltage the speech signals are modulated, and other signals utilized in telephone subscriber sets. Prior art line transformers which could withstand the required large DC biases without saturation of the transformer core and consequent distortion of the relatively small ac speech modulation generated by the carbon microphone which must be coupled from the line transformer primary windings to the transformer secondary windings to which the 2-wire to 4-wire conversion circuitry is connected require either large cores to avoid saturation by the DC current or complex compensation circuitry. Thus, such prior art transformers as a whole must be very large in relation to a transformer which, while required to couple ac signals is not required to pass a large DC current. In order to reduce this requisite large transformer core size and associated cost, prior art fluxbucking techniques compensate for the DC bias in the transformer by sensing the DC components in the magnetic field with Hall effect sensors or by sensing the DC current through the transformer windings with current sensors to derive control signals for use in generating a fluxbucking current of opposite polarity which is then fed back to the transformer windings to cancel out the DC field. Such prior art control circuitry is both complex, expensive and does not effectively compensate for different DC currents in different transformer windings, such as occur in the primary windings associated with telephone tip and ring lines.

SUMMARY OF THE INVENTION

The present invention provides a fluxbucking transformer in which the DC flux in the transformer core produced by DC currents passed by transformer windings are separately compensated for by individual fluxbucking windings, each of which is paired with a transformer winding which passes DC current. Fluxbucking may be defined as the creating of two magnetic fields equal in magnitude but opposite in polarity so that they cancel each other out. Each fluxbucking winding has a number of turns and is connected to have a polarity which cancels the DC flux produced by the transformer winding with which it is paired. Additionally, each transformer winding-fluxbucking winding pair is electrically isolated from other transformer winding-fluxbucking winding pairs such that the separately compensating fluxbucking windings will cancel the DC flux produced only by the transformer winding passing DC current with which it is paired, even when the DC currents in different transformer windings are not of equal magnitude. This is particularly advantageous in telephone line transformers coupled to the subscriber tip and ring lines, in which leakage currents produce differences in the currents in the tip and ring lines. In another feature of the present invention, electronic equivalent terminating impedance is disclosed for reducing the power dissipation in the line feed circuitry.

BRIEF DESCRIPTION OF THE DRAWINGS

FIG. 3 illustrates a transformer with fluxbucking windings in accordance with the present invention.

FIG. 4 illustrates a transformer in accordance with FIG. 3 having electronic equivalent impedances.

DESCRIPTION OF THE PREFERRED EMBODIMENTS

Figure 1:
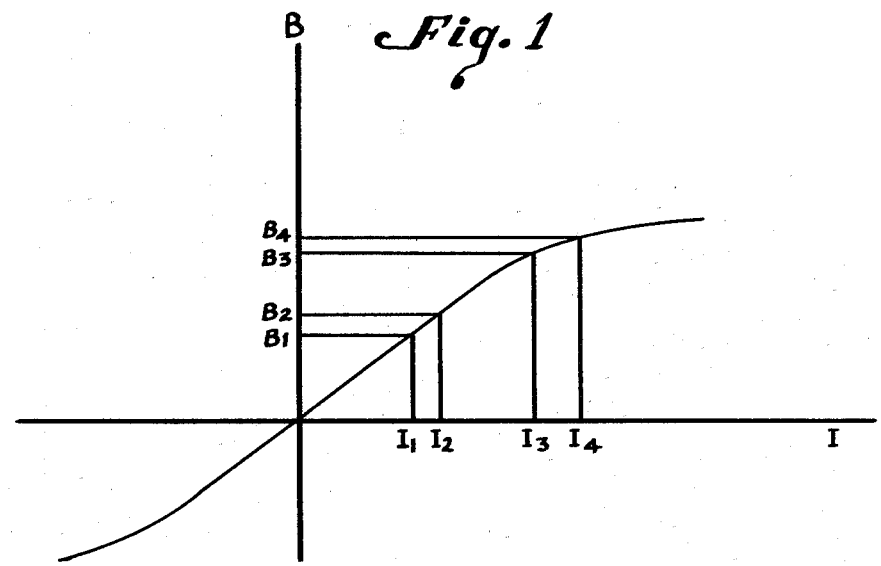
FIG. 1 is a portion of the hysteresis loop of a transformer core illustrative of the relationship of flux density to current.

Referring to FIG. 1, a simplified diagram of a portion of the hysteresis characteristic of a typical transformer is illustrated, showing the variation in flux density (B) in Gauss as a function of applied current (I) in milliamps to a transformer winding. The flux density is related to applied current by the well known relationships:

$$H_{dc} = I_{dc} N/l$$

where ($H_{dc}$) is the DC field in Oersteads, ($I_{dc}$) is the applied DC current to the primary windings, (N) is the number of wire turns and (l) is the magnetic path length in the transformer core. Similarly, the AC field, $H_{ac}$ is:

$$H_{ac} = I_{ac} N/l$$

wherein ($I_{ac}$) is the applied AC current to the primary windings. The flux density (B) is:

$$B = YH_{ac} + YH_{dc}$$

where Y is the core permeability. As is apparent with reference to the foregoing equations and to FIG. 1, the flux density in the transformer core is proportional to the sum of the AC and DC fields, which varies with applied AC and DC currents. There is a linear region of operation of the transformer wherein variations in applied current to the primary windings produce linearly proportional variations in flux density, illustrated by the portion of the curve between $I_1$ and $I_2$ at flux densities $B_1$ and $B_2$. The current to flux density curve becomes nonlinear with increased DC current and finally, saturation occurs when further increase in applied current produces no further increase in the core flux density. Operation in the undesirable nonlinear region is illustrated by the portion of the curve between $I_3$ and $I_4$ at flux densities $B_3$ and $B_4$. Since the transformer flux density is proportional to the voltage coupled to the secondary windings, it is apparent that large DC currents in the transformer windings will cause the transformer to operate in the nonlinear region. In transformer coupled telephone line circuit applications, in which ac modulation must be coupled to the secondary transformer, this causes undesirable distortion of the ac modulation waveform with consequent degradation in the demodulated communications with increasing severity as the saturation region is approached. Accordingly, by compensating for large DC bias, the transformer can be made to operate in its linear region.

Figure 2:
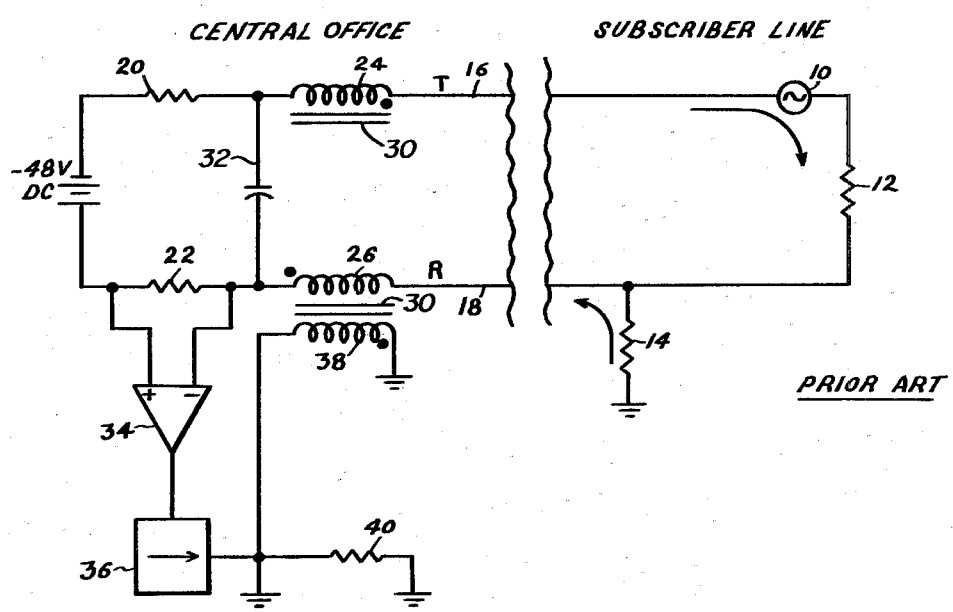
FIG. 2 illustrates a prior art fluxbucking circuit.

Referring to FIG. 2, a simplified circuit illustrative of fluxbucking techniques of the prior art for compensation for the DC field in a transformer is shown. At the subscriber line, speech signals are generated by a carbon microphone 10 having a resistance 12 associated with the microphone and a resistance 14 which represents line leakage to ground. The speech modulation is in the range of one to two volts modulated onto 48 volts DC, on the tip and ring lines 16 and 18 respectively supplied by the central office to each subscriber. Current is coupled thru line feed resistances 20 and 22 to the primary and secondary windings 24 and 26 of the line transformer 30. Capacitor 32 serves to isolate the speech modulation from the 48-volt DC source; however, the large DC bias required, tends to saturate the transformer 30, absent fluxbucking compensation. A threshold circuit 34 of conventional design such as a current sensing amplifier or a Hall Effect device measures the DC current thru feed resistor 22 and couples a feedback control signal to a current control circuit 36, which applies an appropriate opposing current to secondary winding 26 via a fluxbucking winding 38. The positive polarities of windings 24, 26 and 38 are dotted. For simplicity of description, the two-to-four wire conversion circuitry is not shown, but is represented by resistance 40. The foregoing arrangement, in addition to requiring feedback control circuitry and current sensors, will result in imperfect cancellation of the DC flux in core 30 whenever an error exists in the magnitude of the generated opposing DC current in winding 38. Additionally, leakage resistance such as resistance 14 will cause different currents to flow in the tip and ring transformer halfs, resulting in an imperfect cancellation of the DC flux produced by the DC current in tip line 16.

Referring to FIG. 3, a line transformer is illustrated with pairs of fluxbucking windings arranged in accordance with the present invention. The winding leads are connected with polarity as indicated by the positive dots. The transformer may, for example, have a core material of Supermalloy, manufactured by Magnetic Materials, Inc. The five windings may, by way of example, be of 292 turns each of number 33 wire, giving an overall transformer size of approximately $0.8 \times 0.6 \times 0.7$ inches.

The DC voltage ($-48$ volts) applied to the primary windings A, B, C and D of transformer 50 is coupled thereto by feed resistors 52 and 54. The leads of primary winding pair A and B are connected to result in a polarity as indicated by the positive dots such that the identical DC current $I_t$ flowing through each winding coupled to the tip line exactly cancels the DC flux in the transformer core due to the DC current $I_t$ in the tip line. Similarly, another primary winding and fluxbucking winding pair on the ring line, windings C and D, have their respective leads connected with polarities as indicated by the positive dots such that the DC current flowing through windings C and D exactly cancels the flux due to the DC current $I_r$ flowing in the ring line. Since $I_t$ and $I_r$ are individually cancelled by the winding pairs A and B and C and D respectively, no DC flux is produced in the core. Thus, leakage resistance such as resistance 56 which may cause $I_t$ and $I_r$ to have different values will have no effect on the flux cancellation in the core since the DC current in the ring line is cancelled independently of the DC current in the tip line. The voltage coupled across to the secondary 58 of transformer 50 is therefore undistorted since the core of transformer 50 is unsaturated by DC flux and this undistorted secondary voltage (the speech modulation from the subscriber line derived from the carbon microphone 60) which is modulated on the DC voltage is undistorted and coupled to the two-to-four wire hybrid portion of the line circuit (not shown) in conventional manner.

The impedance looking into the tip and ring leads is the sum of feed resistance 52 and 54; hence, with the proper choice of value of resistors 52 and 54, no additional impedance is required on the secondary side of transformer to properly terminate the line. In accordance with standards established in the U.S. and Europe, the terminating feed resistors 52 and 54 are each required to be 450 ohms in the U.S. and 300 ohms in Europe.

With a terminating feed resistor of 450 ohms and a normal loop current as indicated by arrow 62 of 40 ma., the power dissipated in line resistances 52 and 54 is typically about 1.44 watts. Further, to maintain a minimum long line loop current, the value of which is determined by a load resistor 64 typically having a value of 1900 ohms, the battery voltage must be increased to approximately 65 volts DC. For short voltage loops, the load impedance 64 is approximately 100 ohms and the battery voltage is required to be reduced to approximately 40 volts to limit the current and power since with a battery voltage of 65 volts and with a load impedance 64 to 100 ohms, the power in the terminating feed resistors 52 and 54 would be 3.7 watts.

In accordance with a further feature of the present invention, the fixed feed terminating resistors 52 and 54 are advantageously replaced by electronic equivalent impedances 100 and 102, illustrated with reference to FIG. 4. Electronic equivalent impedances 100 and 102 operate as voltage sources at DC but appear as 450 impedance ohms, for example, throughout the voice frequency band. Since the maximum amplitude of normal telephone voice signals is about 4.5 volts, operational amplifier 104 need only operate with about 12 volts across its supply terminals. Thus, at a 40 milliamp loop current illustrated at 62, the total dissipation of equivalent impedances 100 and 102 is about 0.48 watts, a savings of almost one watt. When multiplied by thousands of line transformers, this becomes of significance.

Operational amplifier 104 of electronic impedance 100 and operational amplifier 106 of electronic impedance 102 may comprise transconductance amplifiers, the operation of which is described in Reference Data for Radio Engineers, Sixth Edition, Howard W. Sams and Company at pgs. 21-29 thereof. A voltage of two $V_1$, which may be chosen to be approximately 12 volts higher than the DC line feed voltage appears across Zener diode 108. A voltage divider network of resistors 110 and 112 provides a voltage $V_1$ to the noninverting input of transconductance amplifier 104, which is suitably biased by biasing network 114. The voltage on the tip and ring lines is adjusted from about 4 to 44 volts to maintain 0.40 milliamp loop current for a value of load impedance 64 from about 100 to 1100 ohms. For values of load impedance 64 from 1100 to 1900 ohms, the tip and ring voltages would be held constant and the loop current would drop from 40 to 23 milliamps. Thus the electronic impedance provides an operational capability for both long lines and short lines at a greatly reduced power dissipation per line. The operation of electronic impedance 102 is identical to that described with respect to electronic impedance 100 and the remainder of the fluxbucking circuitry illustrated by FIG. 4 is operationally identical to the fluxbucking line transformer described with reference to FIG. 3.

While the present invention has been described in connection with a preferred embodiment thereof, it is to be understood that additional embodiments, modifications and applications which will become obvious to those skilled in the art are included within the spirit and scope of the invention as set forth by the claims appended thereto.

I claim:

1. A fluxbucking transformer having a core and a plurality of primary windings and at least one secondary winding for passing direct current through the primary windings thereof while coupling a signal from a modulation source modulated on said direct current from the primary windings to said secondary winding comprising:

first and second primary windings adapted to be connected to a DC voltage source such that said DC voltage is maintained between said first primary winding and second primary winding and such that a first DC current flows through said first primary winding and a second DC current flows through said second DC winding, said first and second DC currents producing DC flux in the core of said transformer;

first and second fluxbucking means coupled respectively to said first and second primary windings and to said modulation source, said first fluxbucking means producing DC flux of a magnitude and polarity substantially cancelling the DC flux produced by said first DC current and said second fluxbucking means producing DC flux of a magnitude and polarity substantially cancelling the DC flux produced by said second DC current;

secondary winding means for coupling said signal modulated on said direct current from the primary windings to said secondary winding;

first and second impedances, said first impedance being coupled between said first primary winding and said DC source and said second impedance being coupled between said second primary winding and said DC source such that said first and second impedances are line terminating impedances, comprised of electronic equivalent impedances having a reduced power dissipation; and wherein said first fluxbucking means comprises a fluxbucking primary winding having a number of turns substantially the same as the number of turns of said first primary winding and being connected with a polarity opposite to the polarity of said first primary winding and wherein said second fluxbucking means comprises another fluxbucking winding having a number of turns substantially the same as the number of turns of said second primary winding and being connected with a polarity opposite to the polarity of said second primary winding.

2. A fluxbucking transformer in accordance with claim 1 wherein said first DC current and said second DC current are equal.

3. A fluxbucking transformer in accordance with claim 1 wherein said first DC current and second DC current are unequal.

4. In a telephone line circuit having a tip line, a ring line, a source of DC voltage and a line transformer for coupling speech signals modulated on said DC voltage from the primary to the secondary of said line transformer, the improvement comprising:

a first primary winding coupled to the tip line and a second primary winding coupled to the ring line of said line transformer such that a first DC current flows in said first primary winding and a second DC current flows in said second primary winding;

first and second fluxbucking windings coupled respectively to said first and second primary windings for substantially cancelling the DC flux produced in the core of said transformer by said first and second DC currents;

secondary winding means for coupling said signal modulated on said direct current from the primary windings to the secondary of said line transformer;

first and second impedances, said first impedance being coupled between said first primary winding and said DC source and said second impedance being coupled between said second primary winding and said DC source such that said first and second impedances are line terminating impedances, comprised of electronic equivalent impedances having a reduced power dissipation; and wherein said first fluxbucking winding comprises a fluxbucking primary winding having a number of turns substantially the same as the number of turns of said first primary winding and being connected with a polarity opposite to the polarity of said first primary winding and wherein said second fluxbucking winding comprises another fluxbucking primary winding having a number of turns substantially the same as the number of turns of said second primary winding and being connected with a polarity opposite to the polarity of said second primary winding.

* * * * *